United States Patent [19]
Bennett

[11] 4,033,159
[45] July 5, 1977

[54] MOTORCYCLE LOCK
[75] Inventor: Bruce A. Bennett, Larkspur, Calif.
[73] Assignee: Creative Innovations, Tiburon, Calif.
[22] Filed: Apr. 17, 1975
[21] Appl. No.: 568,977
[52] U.S. Cl. .................................. 70/233; 70/228
[51] Int. Cl.² .......................................... B62H 5/00
[58] Field of Search ............ 70/233, 236, 226, 228, 70/193, 194; 188/265

[56] References Cited
UNITED STATES PATENTS

| 445,118 | 1/1891 | Krieger et al. | 70/233 |
| 897,926 | 9/1908 | Peducasse | 70/228 |
| 1,645,914 | 10/1927 | McLeod | 70/193 |

FOREIGN PATENTS OR APPLICATIONS

| 851,244 | 1/1940 | France | 70/194 |
| 22,456 | 11/1928 | Netherlands | 188/265 |
| 375,602 | 6/1932 | United Kingdom | 188/265 |
| 22,529 | 11/1915 | United Kingdom | 70/228 |

Primary Examiner—Robert Hafer
Attorney, Agent, or Firm—Gordon Wood

[57] ABSTRACT

A lock for preventing theft of a motorcycle. When the cycle is parked the brake is applied so that a detent holds the brake mechanism in locked position. The detent is actuatable by a key for releasing the brake.

3 Claims, 4 Drawing Figures

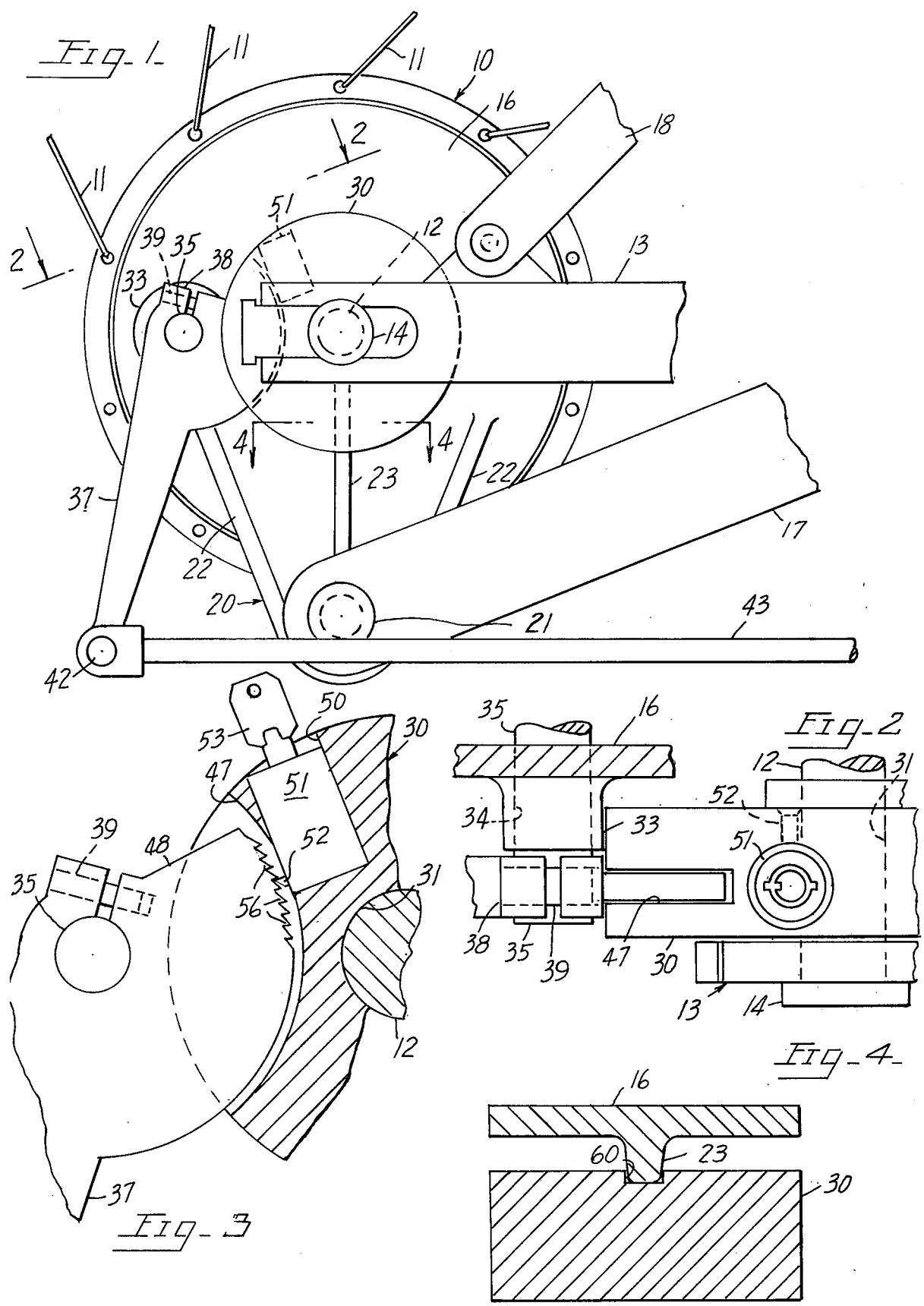

MOTORCYCLE LOCK

This invention relates to a lock for motorcycles to prevent the cycle from being driven or pushed away except by an authorized person.

The main object of the present invention is the provision of an effective lock for locking the rear brake in locked position when the motorcycle is parked.

Another object of the invention is the provision of a motorcycle lock which may be readily unlocked merely by turning a key in a key operated lock.

Still another object is the provision of a lock for a motorcycle, and which lock remains on the motorcycle at all times and cannot be removed.

Other objects and advantages will be apparent from the following specification and from the drawings.

FIG. 1 is a fragmentary side elevation of the hub portion of a conventional motorcycle showing the present invention.

FIG. 2 is a fragmentary view of the invention taken in a plane indicated by lines 2—2 of FIG. 1.

FIG. 3 is a greatly enlarged fragmentary sectional view of the spacer and cooperating lever.

FIG. 4 is a cross sectional view through the brake mounting plate and the spacer, as taken in a plane indicated by lines 4—4 of FIG. 1.

In detail and first with reference to FIG. 1, the invention is adapted to be employed with a conventional motorcycle having a rear wheel hub 10 which is connected by outwardly extending spokes to the outer wheel portion (not shown) of the wheel. Some of said spokes are indicated at 11 in FIG. 1. The rear wheel is rotatably supported on an axle 12 which extends outwardly through a frame member 13 and is provided at its outer end with a nut 14. The axle 12 also passes through a brake mounting plate 16 which is fixedly secured relative to the body of the cycle by lower frame member 17. An upper frame member 18 secured to the frame 13 is usually also provided.

The brake supporting plate 16 is formed with a downwardly extending extension 20 to which the lower frame member 17 is pivotally secured as at 21. To strengthen the extension 20, a pair of converging outer reinforcing ridges 22 are provided and also a central vertically extending ridge 23 (FIG. 4).

The chain driven sprocket wheel is on the opposite side of the cycle and is not shown in the drawings. However, in order to make a symmetrical arrangement on both sides of the cycle, a spacer is usually interposed between the frame member 13 and the brake support plate 16. This support is normally quite large and may be more than an inch in thickness. By the present invention the conventional spacer is replaced by a substantially solid housing generally designated 30. This housing is provided with a central bore 31 (FIG. 2) through which the axle 12 extends.

Rearwardly of the rear axle 12 the brake support plate 16 is provided with an outwardly projecting boss 33 which is provided with a central bore 34 for rotatably receiving therein a brake actuating shaft 35. A generally downwardly extending brake actuating lever 37 is fixedly secured at its upper end to shaft 35 by means of a clevis 38 adapted to be tightened by a "security bolt" 39 which cannot be removed.

The lower end of lever 37 is swingably connected by pivot 42 to a forwardly extending rod 43 which is connected at its right hand end to the brake pedal (not shown). At this point it will be understood that according to conventional design when the brake pedal is pressed downwardly the rod 43 moves to the right thereby swinging the lever 37 in a counterclockwise direction to actuate the usual camming members which in turn move the brake shoes radially outwardly to engage the brake. None of the brake structure is shown in the drawings, as it is conventional.

The housing 30 is provided with an outwardly opening slot 47 (FIGS. 2-3), which is adapted to receive therein a planar segment 48 of relatively heavy material which is integrally connected to the lever 37.

The housing 30 is also provided with an inwardly extending bore 50 which is adapted to receive therein a lock 51 which may be held in place in bore 50 by means of a set screw 52 (FIG. 2). The lock 51 is of a conventional type and includes a latch bolt 52 (FIG. 3) which is normally projected by a spring (not shown) and which may be retracted by turning the key 53 of the lock 51. As best seen in FIG. 3, the latch 52 cooperates with one of a plurality of ratchet like teeth 56, formed on the periphery of segment 48. Thus when the pedal is applied and the segment 48 rotates in a counterclockwise direction about pin 35, one of the teeth 56 is engaged by latch 52 thereby preventing movement of the shaft 35 to brake releasing position.

The provision of a plurality of relatively fine teeth 56 permits one of the teeth to cooperate with latch 52 regardless of wear in the brake shoes.

When it is desired to release the brake it is merely necessary to insert key 53 in lock 51 and retract latch 52. The brake will then return to its normal unenergized position in the conventional manner.

In order to prevent rotation of housing 30 relative to the brake support plate 16, said housing 30 may be provided with a vertically extending slot 60 which cooperates with the central reinforcing ridge 23 on brake support plate 16 so as to effectively prevent any relative rotational movement between plate 16 and housing 30.

I claim:

1. In combination with a cycle having a rear axle and a frame member connected to said axle, a brake plate fixed relative to said axle, and a brake actuating lever swingably mounted on said plate, a lock for said cycle comprising:
   a housing interposed on said axle between said frame member and said brake plate,
   an extension integral with said lever and provided with a detent,
   said housing being formed with an opening for receiving said extension therein,
   a key actuated lock mounted in said housing and provided with a lock element adapted to engage said detent to prevent movement of said lever from brake actuating position.

2. A structure according to claim 1 wherein said extension comprises a plate integral with said lever and formed with a tooth along one edge to provide said detent.

3. A structure according to claim 2 wherein a plurality of teeth are formed along said one edge to permit said locking element to engage one of said teeth when the brake is applied.

* * * * *